Figure 1:
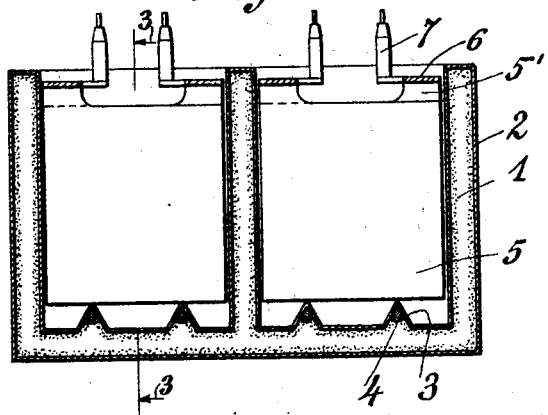

March 27, 1928.  1,663,887

E. LYNDON

ELECTRIC BATTERY CONTAINER

Filed Jan. 21, 1926

Inventor
Edward Lyndon.
By his Attorney
Alexander Chessin

Patented Mar. 27, 1928.

1,663,887

UNITED STATES PATENT OFFICE.

EDWARD LYNDON, OF NEW YORK, N. Y.

ELECTRIC-BATTERY CONTAINER.

Application filed January 21, 1926. Serial No. 82,731.

My invention relates to containers of electric storage batteries and particularly to containers of so called lead batteries, i. e. batteries comprising elements made of lead oxide immersed in dilute sulphuric acid.

The class of containers here considered is that which comprises vessels made of acid non-resisting material, such, for instance, as wood, covered with a protective coating of acid-resisting material.

Battery jars are usually provided with supporting bridges for the battery plates. When, as in the present invention, the jar is eliminated and the container is coated with a protective film which takes the place of the acid-resisting jar, the supporting bridges are located in the container itself.

In an application for patent Ser. No. 82,730, filed simultaneously herewith, I have shown such a container made of an acid non-resisting material covered with a protective coating of an acid-resisting substance penetrating below the surface of the acid non-resisting material.

When the battery is not subjected to knocks and vibrations, the arrangement disclosed in the aforesaid application serves the purpose. But I have found that where the battery is used in transportation, as, for instance, in an automobile, the constant knocks and vibration are apt to break the protective coating on the supporting bridges. My present invention is intended to provide a battery suitable for such service.

In order to prevent the destructive effect of breaks in the coating of the supporting bridges, I provide an additional safeguard which consists in tough, acid-resisting caps for the supporting bridges, made of hard rubber, bakelite, or the like. Preferably, the cap is imbedded in the bridge and anchored lengthwise. I may effect the lengthwise anchorage by extending the cap into the side walls of the container.

In the preferred form of container disclosed in my above referred to other application, the material used for the container is pressed wood pulp. In this case, the caps are placed in the mould in their proper position and the container is pressed out as a complete unit, with the caps imbedded in the supporting bridges and side walls. Then, the container is dipped in the protective substance, such as, for instance, vulcolac, care being taken to allow this substance to penetrate below the surface of the wood pulp. Vulcolac is a solution of hard rubber in an organic solvent such as solvent naphtha. It is described in the British Patent No. 243,-966, 1925. While vulcolac is not acid resisting when in a plastic state, it acquires all the characteristics of hard rubber, when set, namely, it is acid proof and resists the action of oxygen and of hydrogen given out during the charge or discharge of a battery. When the material is less permeable than wood pulp, it may be necessary to force the protective substance under the surface of this material by means, for instance, of a vacuum pump.

Figure 2:
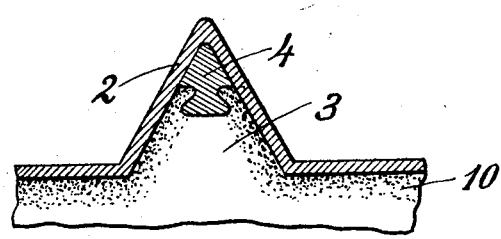
Figure 3:
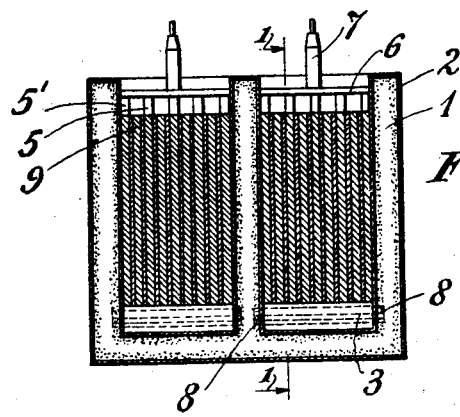

Referring to the drawing, Figure 1 is a vertical cross section through my container, Figure 2 is a detail of the supporting bridge, and Figure 3 is vertical cross section of my container taken along the line 3—3 of Figure 1.

In all of these figures, 1 is the container made of acid-resisting material, 2 is an acid-resisting coating, penetrating below the surface of the acid non-resisting material, as indicated by 10 in Figure 2; 3 is a supporting bridge for the battery plates, 4 is a cap of a tough acid-resisting material imbedded in the bridge 3 and in the adjacent walls of the container, as at 8; 5 and 5' are positive and negative battery plates, 6 the usual plate connecting strip, 7 the terminal posts, one being provided for each set of positive and each set of negative plates; and 9 is the usual battery plate separator.

I claim:

1. In a battery container made of an acid non-resisting material, a projection on the inner surface thereof, and a cap made of a tough acid-resisting material on said projection, said container, including said projection and said cap, being covered with an acid-resisting substance.

2. In a battery container made of an acid non-resisting material, projections on the inner surface thereof, and a cap made of a tough acid-resisting material imbedded in each one of said projections, said container, including said projections and said caps, being covered with an acid-resisting substance.

3. In a battery container made of an acid non-resisting material, supporting bridges for the battery plates, and a cap made of tough acid-resisting material imbedded in each one of said bridges and in the walls adjacent thereto, said container, including said bridges and said caps, being covered with an impervious acid-resisting substance.

4. In a battery container made of a permeable acid non-resisting material, projections on the inner surface thereof, and a cap made of a tough acid-resisting material imbedded in each one of said projections, said container, including said projections and said caps, being covered with an impervious acid-resisting substance penetrating below the surface of said acid non-resisting material.

5. In a battery container made of a permeable acid non-resisting material, supporting bridges for the battery plates, and a cap of a tough acid-resisting material imbedded in each one of said bridges and in the walls adjacent thereto, said container, including said bridges and said caps, being covered with an impervious acid-resisting substance penetrating below the surface of said acid non-resisting material.

6. In a battery container made of pressed wood pulp, a projection on the inner surface thereof, and a cap of tough acid-resisting material imbedded in said projection, said container, including said projection and said cap, being covered with an impervious acid-resisting substance penetrating below the surface of said wood pulp.

7. In a battery container made of pressed wood pulp, supporting bridges for the battery plates, a cap made of a tough acid-resisting material imbedded in each one of said bridges and in the walls adjacent thereto, said container, including said bridges and said caps, being covered with an impervious acid-resisting substance penetrating below the surface of said wood pulp.

8. In a battery container made of pressed wood pulp, supporting bridges for the battery plates, a cap of a tough acid-resisting material imbedded in each one of said bridges and in the walls adjacent thereto, said container, including said bridges and said caps being covered with a coating of hard rubber penetrating below the surface of said wood pulp.

EDWARD LYNDON.